United States Patent [19]

Tsutsumi

[11] Patent Number: 5,532,741
[45] Date of Patent: Jul. 2, 1996

[54] VIDEO IMAGE DISPLAY AND VIDEO CAMERA FOR PRODUCING A MIRROR IMAGE

[75] Inventor: Kunihiro Tsutsumi, Kyoto, Japan

[73] Assignee: Rohm Co., Ltd., Kyoto, Japan

[21] Appl. No.: 243,859

[22] Filed: May 17, 1994

[30] Foreign Application Priority Data

May 19, 1993 [JP] Japan ................................. 5-140106

[51] Int. Cl.[6] ........................ H04N 5/262; H04N 5/225
[52] U.S. Cl. ...................... 348/239; 348/589; 345/141; 345/126
[58] Field of Search .................................. 348/589, 600, 348/239, 14, 16, 583; 345/126, 141; 382/45, 44, 46; H04H 7/14, 5/225, 5/278, 262

[56] References Cited

U.S. PATENT DOCUMENTS

| | | | |
|---|---|---|---|
| 4,326,201 | 4/1982 | Enokizono | 340/800 |
| 4,533,911 | 8/1985 | Finegold | 345/126 |
| 5,060,072 | 10/1991 | Hojo et al. | 348/516 |
| 5,282,234 | 1/1994 | Murayama et al. | 345/50 |
| 5,333,016 | 7/1994 | Tsutsumi | 348/589 |
| 5,333,264 | 7/1994 | Tsutsumi | 345/194 |
| 5,379,069 | 1/1995 | Hamasaki | 348/322 |

FOREIGN PATENT DOCUMENTS

| | | | |
|---|---|---|---|
| 0106581 | 4/1989 | Japan | H04N 5/225 |
| 2177685 | 7/1990 | Japan | H04N 7/14 |
| 4213496 | 8/1992 | Japan | G09G 5/32 |

*Primary Examiner*—Safet Metjahic
*Assistant Examiner*—Michael H. Lee
*Attorney, Agent, or Firm*—Fay, Sharpe, Beall, Fagan, Minnich & McKee

[57] ABSTRACT

A serial pattern generator circuit for serially outputting a bit pattern corresponding to one line received in parallel from a character generator and, in response to a predetermined control signal, generating the serial bit pattern with an inverted bit sequence is disclosed. A combining circuit is provided for combining an output of the serial pattern generator circuit with a video signal of a displayed video image. A mirror image signal generator circuit responsive to an output signal of the combining circuit and the control signal is provided in order to generate a mirror image signal.

4 Claims, 4 Drawing Sheets

VIDEO IMAGE DISPLAY AND VIDEO CAMERA FOR PRODUCING A MIRROR IMAGE

FIELD OF THE INVENTION

The present invention relates to a video image display device and a video camera including the video image display device, in particular, the video image display device may be used in a video tape recorder (VTR) having a video camera integrated therewith in order to superimpose characters or a pattern on a background video image. The present invention also relates to a video camera having a liquid crystal monitor, a VTR system having a video camera, a laser disc system having a video camera or a television telephone device, which, when displaying a user himself by producing a mirror image is given thereto, can correctly display characters, etc., to be superimposed without providing a character generator for the mirror image pattern.

BACKGROUND OF THE INVENTION

U.S. Ser. Nos. 07/894,851 and 07/895,639 assigned to the same assignee of this application disclose video image display devices for synthesizing and displaying characters and/or title graphics, etc.

The teachings of these prior applications will be described first.

FIG. 5 is a block diagram illustrating a conventional video image display device for synthesizing and displaying digital a character image signal generator circuit portion of the device is shown.

The character image signal generator circuit 15 is provided with a display data RAM 5 for storing a plurality of character codes to be displayed.

In order to write a character code W supplied from a microcomputer 1 to the display data RAM 5, this circuit is provided with a write address register 2 for holding an address signal A out of control/data signals B from the microcomputer 1, a write data register 3 for holding the character code W, a write synchronizing signal S according to the control signal therein, an address selecting circuit 6 for generating an address signal U directed to the display data RAM 5 upon receiving the write signal S from the write synchronizing circuit 4.

In order to read a display character code G from the display data RAM 5, the character image signal generating circuit 15 is provided with a vertical address counter 12 for generating a line selecting signal R upon receiving a vertical synchronizing signal H from a synchronizing signal generating circuit 11 for generating a dot clock D upon receiving the horizontal synchronizing signal H. The character image signal generating circuit 15 is also provided with a horizontal address counter 10 for generating a column selecting signal C upon receiving the horizontal synchronizing signal H and the dot clock D and applying the column selecting signal C to the address selecting circuit 6 and the write synchronizing circuit 4.

In order to display a pattern of the character code thus selected, the character image signal generating circuit 15 is further provided with a character generator 7 for generating a character pattern P equivalent to one line out of the pattern equivalent to one character upon receiving an address signal L generated in the address selecting circuit 6 and the character code G thus selected serial converter circuit 8 is provided for sequentially outputting a character pattern having a plurality of bits corresponding to one line dot by dot through the dot clock D. The output signal of the serial converter circuit 8 is combined with another image signal E before being applied to CRT 9 on which a superimposed image is displayed.

A camera integrally combined with video and having a large scale liquid crystal display device as a monitor has been commercialized recently. Such camera will be referred to as "liquid crystal monitor movie" hereinafter. In such liquid crystal monitor movie, a camera portion and a display device can be inverted mutually, so that a user can take a picture of himself by inverting the camera portion and display it on the display device. In a TV telephone, both talkers are displayed on a screen.

When a user himself is to be displayed his right side is shown on the left left and is not shown as a mirror image. In order to make it a mirror image in such video image display device, a function is given to the liquid crystal display device for displaying an image obtained when a video camera portion by converting it into a mirror image. The reason for providing such a mirror image converter circuit on the side of the liquid crystal display device is that it is necessary to record an image signal on a video tape in normal condition.

Thus, it is possible to obtain the same image as the user's mirror image and there may be no unnatural feeling. However, when a displayed image is converted into the mirror image, characters to be superimposed are also converted into their mirror image, which is unnatural.

In order to solve such a problem, two kinds of character generators are provided conventionally. One of them produces symbols and characters which correspond to a usual image and the other produces mirror images of symbols and characters. When the video camera is directed to the user, the character generator producing mirror image characters and/or symbols is selectively used. The mirror image characters and/or symbols are combined with the video image and the combined image is then mirror image converted, so that normal characters and/or symbols are superimposed on the mirror video image.

In such conventional video image display device, however, two character generators must be provided. Each character generator requires a large memory capacity due to the fact that characters and/or symbols are stored in bit pattern. Therefore, when two character generators be provided in an IC, its integration area becomes so large that other function circuits can not be integrated therein.

Further, there may be limitation of IC area in which character generators can be integrated in view of other integrated circuits. Therefore, when such function as displaying mirror image is added to the device, the number of ICs to be mounted on the video image display device is increased.

SUMMARY OF THE INVENTION

An object of the present invention is to provide a video image display device capable of correctly displaying superimposed characters, etc., in mirror image on a screen by using a simple circuit added thereto, instead of one of two character generators having mirror image relation to each other.

Another object of the present invention is to provide a video image display device which has a mirror image display function and a superimposing function with minimum number of built-in ICs.

A further object of the present invention is to provide a video camera capable of correctly displaying superimposed characters, etc., in mirror image on a screen by using a simple circuit added thereto, instead of one of two character generators having mirror image relation to each other.

The video image display device or the video camera according to the present invention includes a serial pattern generator circuit which receives a bit pattern corresponding to one line from a character generator in parallel and outputs it as a serial output bit pattern and which responds to a predetermined control signal to generate a serial bit pattern obtained by inverting the serial output bit pattern in time, a combiner circuit for combining the output of the serial pattern generator circuit with a video signal to be displayed and a mirror image video signal generator circuit responsive to the combined output from the combiner circuit and the control signal for generating a mirror image video signal.

By providing the pattern generator circuit which mirror-images and outputs only one line of one character output from the character generator, the character generator having mirror image pattern becomes unnecessary.

In this case, since the bit pattern to be made mirror image is only one line of one character, the pattern generator circuit may be simple. For example, it can be realized by providing a register for storing a bit pattern corresponding to one line of one character and a switching circuit for switching a read out direction of the register or providing a wiring functioning to store memory position of the bit pattern in mirror image relation and selecting its data in the register. Alternatively, this circuit can be realized by setting a pattern data corresponding to one line of one character in a shift register and reading it in reverse direction. Since this circuit functions to reverse the bit data train corresponding to one line of one character and is equivalent to a video image display device having no mirror image display function, there is substantially no increase of integrated circuit size and its circuit construction is simple. Compared with the conventional device having mirror image display function, its integrated area is small and therefore a larger number of other function circuits and peripheral circuits can be incorporated in a single IC. As a result, it is possible to reduce the number of ICs to be mounted on the video image display device.

DESCRIPTION OF THE PREFERRED EMBODIMENT

Figure 1:
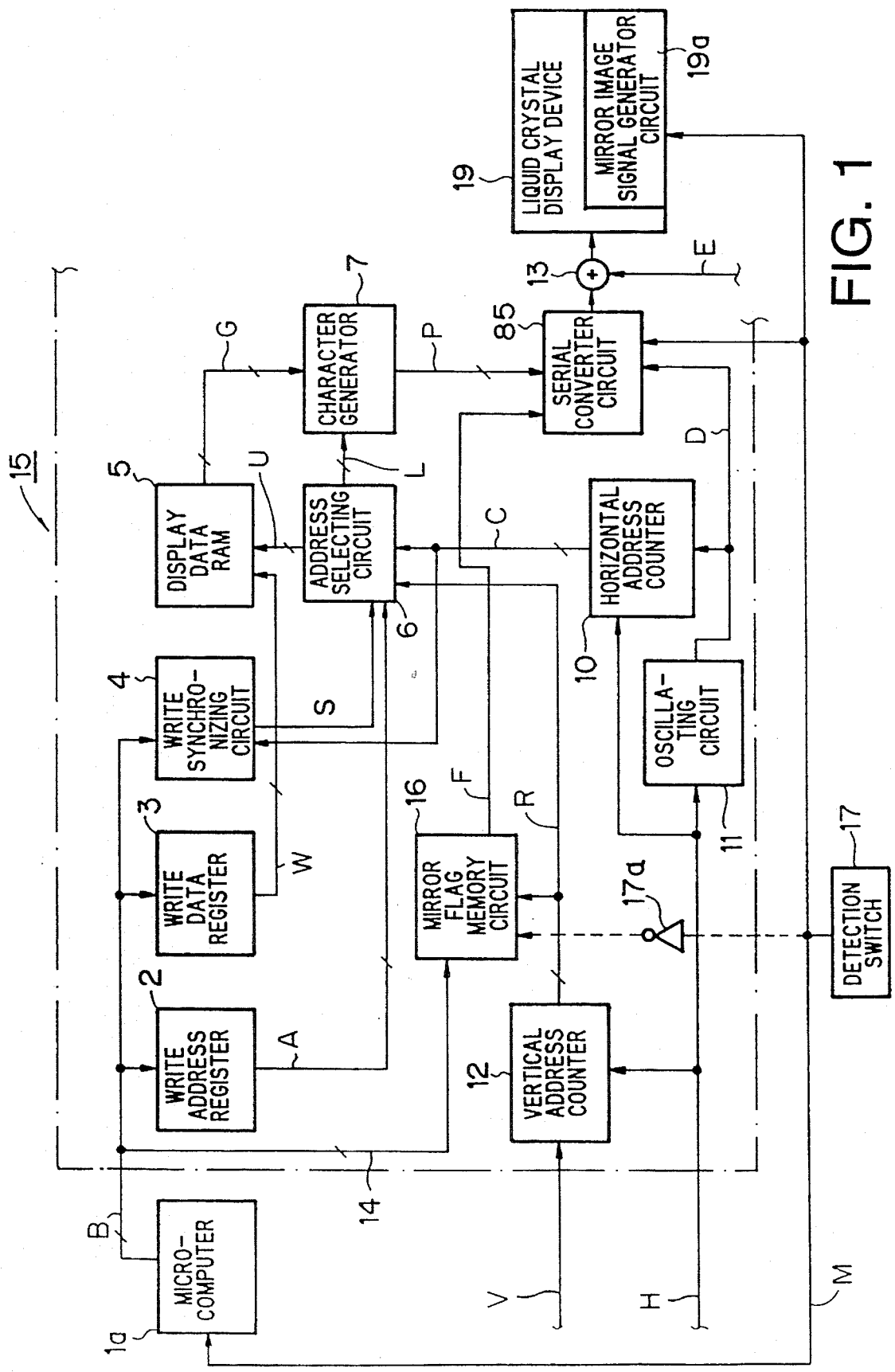
FIG. 1 is a block diagram of a character video image signal generator circuit of a video image display device in a liquid crystal monitor movie according to an embodiment of the present invention.
Figure 5:
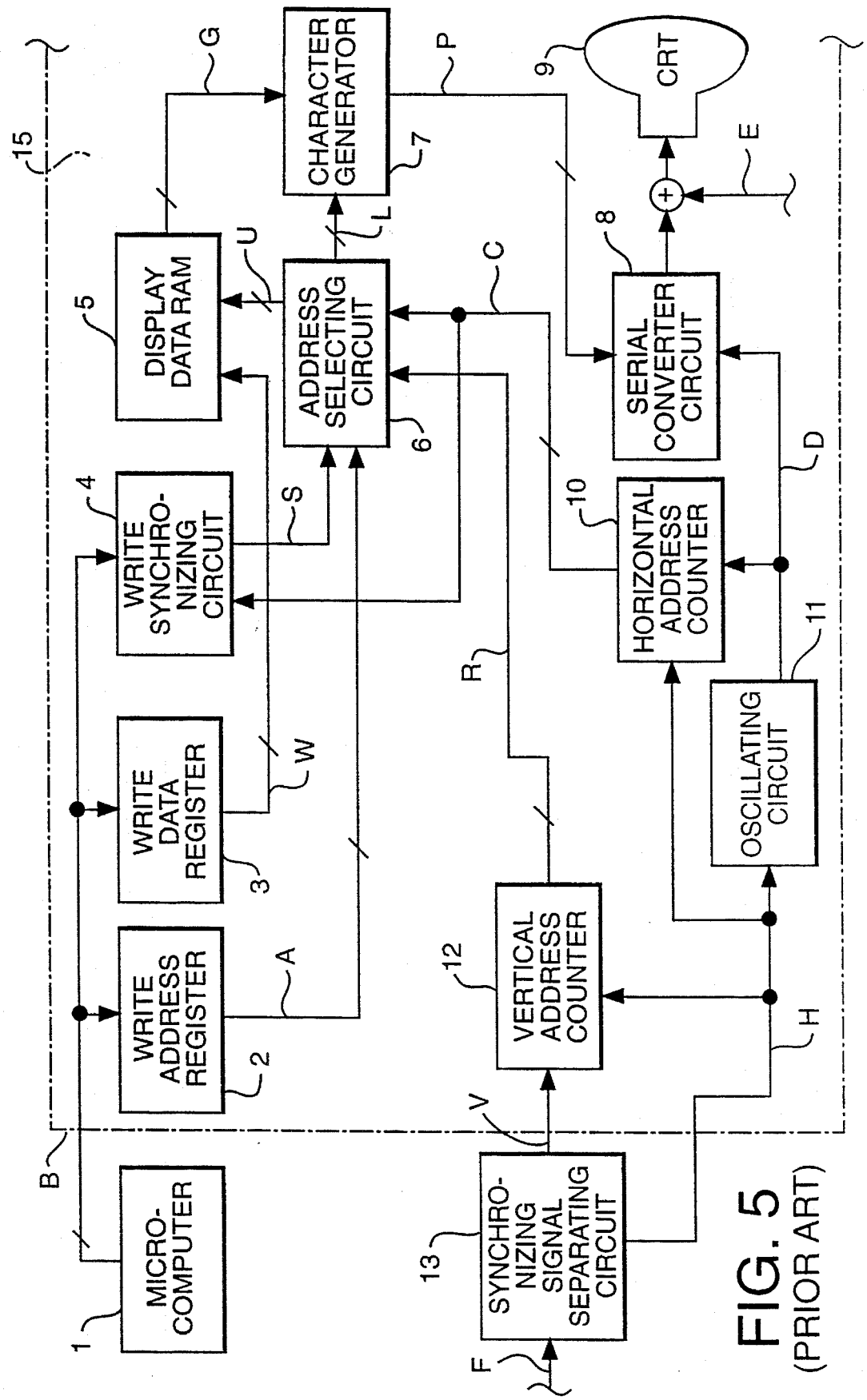
FIG. 5 is a block diagram of a conventional video image display device having superimposing function.

In FIG. 1, same components as those shown in FIG. 5 are depicted by same reference numerals, respectively, without description thereof.

Figure 3:
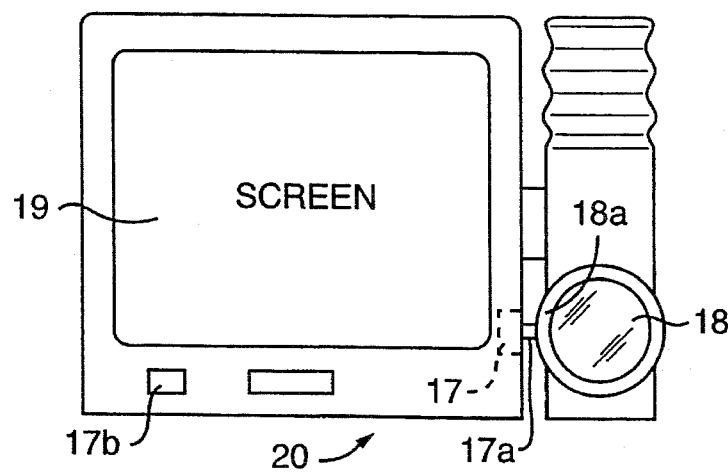
FIG. 3 illustrates a detection switch for detecting an inversion of a video camera portion.

Constructive differences between FIGS. 1 and 5 are provisions of a mirror flag memory circuit 16 and a serial conversion circuit 85 for generating a mirror image pattern in response to a signal from the mirror flag memory circuit 16, instead of the serial conversion circuit 8, as the serial pattern generator circuit. A microcomputer 1a has a function of generating a bit of a mirror flag and writing it in the mirror flag memory circuit 16, in addition to the function of the microcomputer 1 shown in FIG. 5. The CRT display 9 as the monitor in FIG. 5 is substituted by a liquid crystal display device 19 and a video camera portion 18 is included as shown in FIG. 3.

The serial conversion circuit 85 receives a parallel character pattern "P" corresponding to one line of a character when it does not receive a mirror image setting signal M (to be described later) output from a detection switch 17 (FIG. 3) and outputs it serially bit by bit (dot by dot) in the order of significance of respective bits constituting the bit pattern "P" according to dot clock D. When it receives the mirror image setting signal M, it reverses the order of significance of the character pattern "P" corresponding to one line to produce a mirror image bit pattern and outputs it sequentially dot by dot according to the dot clock D.

A video image combiner circuit 13 superimposes the character pattern output from the serial conversion circuit 85 on a video image signal E of usual background still image or moving image dot by dot and outputs them. The output of the video image combiner circuit 13 is supplied to the liquid crystal display device 19 and displayed thereon.

A mirror image video signal generator circuit 19a is provided in the liquid crystal display device 19 and responds to the mirror image setting signal M to produce a video signal corresponding to the mirror image pattern which is mirror-imaged by reversing in horizontal scan on a screen the output corresponding to one line of a video signal (a right side and a left side of the display screen correspond to a start side and an end side of a scanning direction in horizontal scan), a video signal obtained by the reverse scan and sends it to a liquid crystal drive circuit of the liquid crystal display device 19. An image displayed thereby is a mirror image with respect to the original video image.

Since the display data itself is signal processed mainly by a digital processing circuit within the liquid crystal display device, the mirror image signal generator circuit 19a has a function of reverse-scanning a horizontal one line and producing the mirror image signal by such as reversing a shift operation, etc., of a shift register related to horizontal scan. Liquid crystal display device having such a function are well known.

Figure 2:
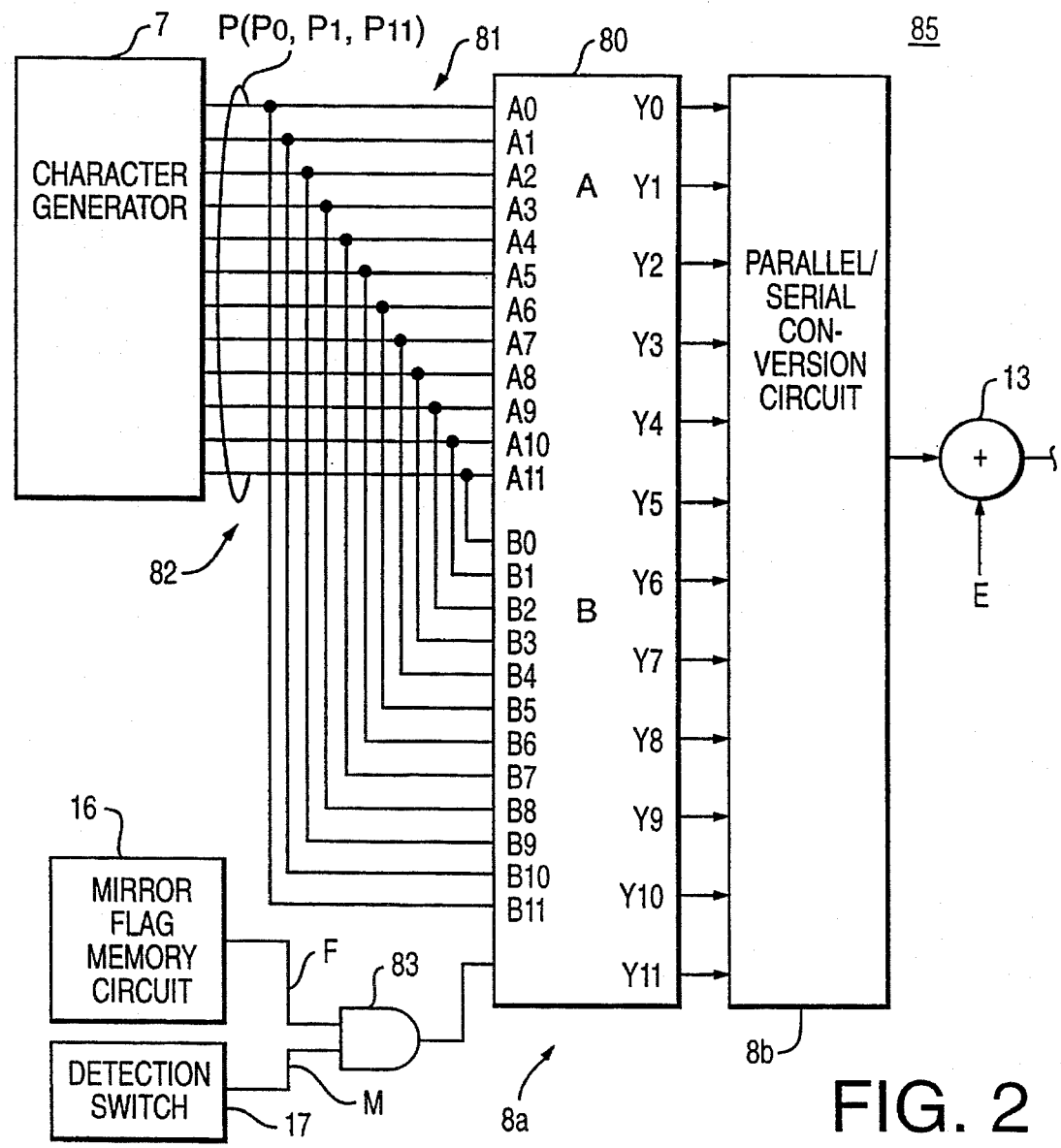
FIG. 2 is a block diagram of a serial conversion circuit for generating a mirror image display pattern.

The serial conversion circuit 85 comprises a normal/mirror image bit pattern generator circuit 8a which responds to a switching between a normal display and a mirror image display to generate respective bit pattern and a parallel/serial conversion circuit 8b, as shown in FIG. 2.

The normal/mirror image bit pattern generator circuit 8a comprises a 2-input, 1-output selector 80 of 12 bits which receives a mirror flag F (mirror processing permission signal) from a mirror flag memory circuit 16 as an input switching signal, a wiring portion 81 for inputting a bit pattern of 12 bits to the side of a first input A as it is and a wiring portion 82 for sending the 12-bit pattern to the side of a second input B while reversing a sequence of significances of the respective 12 bits by a mirror connection. The wiring portion 82 forms a mirror pattern generator circuit.

Therefore, the first input A receives the bit pattern P0, P1, ..., P11 corresponding to one line output from the character generator 7 at A0, A1, ..., A11 as they are while the second input B receives the bit pattern in the sequence B11, B10, ..., B0. Therefore, when the second input B is selected, the bit pattern P0, P1, ..., P11 corresponding to one line is converted into a mirror image bit pattern P11, P10, ..., P0 which appear at outputs Y0, Y1, ..., Y11. When the first input A is selected, the bit pattern P0, P1, ..., P11 corresponding to one line appear at outputs Y0, Y1, ..., Y11 in the order.

The parallel/serial conversion circuit 8b receives either of them in parallel and outputs them in series. As a result, the parallel/serial conversion circuit 8b outputs a mirror image display bit pattern when the second input B is selected.

The selection between the first input A and the second input B of the selector 80 is performed by an output of an AND circuit 83 such that, when the output of the AND circuit 83 is "0" (LOW level), the first input A is selected while, when it is "1" (HIGH level), the second input B is selected.

The mirror flag memory circuit 16 is constituted with a 1-bit flip-flop and stores a flag permitting the mirror processing for displaying superimposed characters in reversed state as the mirror flag F. This generates a permission signal (F="1") for permitting the serial conversion circuit 85 to perform the mirror processing. In order to do so, "1" is set by the microcomputer 1a through the control line 14. Otherwise, a flag set by the microcomputer 1a is reset or the flag is "0" initially. When the flag is initially "0", the characters to be superimposed correspond to those to be displayed and, when a mirror image display is performed, the superimposed characters are displayed in mirror image.

When the microcomputer 1a receives a mirror image setting signal M, "1" is written in the mirror flag memory circuit 16. The mirror image setting signal M is generated when the detection switch 17 is turned ON. When a switch for invalidating the mirror image setting signal M, such as a manual switch 17b (FIG. 3) is depressed, the microcomputer 1a does not write "1" in the mirror flag memory circuit 16.

A mirror image display is detected by the detection switch 17 which detects the turning-over of the video camera portion. The detection switch 17 is a limit switch and detects whether or not the shooting direction of the video camera coincides with the direction of the display screen of the display device. This switch is provided on an inner side of a main body 20, which includes the liquid crystal display device 19, adjacent to the camera portion 18 thereof, as shown in FIG. 3. As can be seen in FIG. 3, when the camera portion 18 is turned to the user side, a protruded portion 18a protruding from the camera portion 18 pushes down an operator 17a of the detection switch 17. With this, the detection switch 17 is turned ON and generates the mirror image setting signal M.

The mirror image setting signal M is supplied to one input of the 2-input AND circuit 83 of the normal/mirror image bit pattern generator circuit 8a in FIG. 2. Flag F of the mirror flag memory circuit 16 is supplied to the other input of the AND circuit 83. The microcomputer 1 responds to the mirror image setting signal M to set the flag of the mirror flag memory circuit 16 with "1" normally. When there is a release instruction of mirror processing from the switch 17b, the microcomputer does not set the flag of the mirror flag memory circuit 16 but keeps it "0".

In a case where there is no mirror processing release instruction, that is, in the normal state, the flag of the mirror flag memory circuit 16 becomes "1" when the detection switch 17 is turned ON. Therefore, the output of the AND circuit 83 becomes "1" (HIGH level). As a result, the bit pattern P0, P1, ..., P11 which corresponds to one line and output in parallel from the character generator 7 is converted into a mirror image bit pattern P11, P10, ..., P1 which is output in parallel at the outputs Y0, Y1, ..., Y11.

The flag stored in the mirror flag memory circuit 16 is reset by the microcomputer 1 through the control line 14 when the detection switch 17 is turned OFF and the mirror image setting signal M disappears. However, the mirror flag "1" in the mirror flag memory circuit 16 may be directly reset to "0" by an output of the inverter 17a for inverting the output of the detection switch 17 as shown by a dotted line in FIG. 1.

In a case where the user is shot by tuning the camera portion 18 over toward the side of the liquid crystal display device 19, the detection switch 17 is turned ON. As a result, the mirror image setting signal M is generated. the mirror image bit pattern is output serially from the serial conversion circuit 85 and added to the background by means of the image combining circuit 13. The video signal of the combined image is converted into the mirror image bit pattern by the mirror image signal generator circuit 19a of the liquid crystal display device 19. Thus, the mirror image of the user is displayed on the screen of the liquid crystal display device 19 with the superimposed characters being normal.

When, in order to confirm a state of mirror image display, the manual switch such as the externally operable switch 17b is operated such that the superimposed characters are displayed in mirror image, the microcomputer 1 does not set the flag in the mirror flag memory circuit 16 to "1" and the output of the AND circuit 83 is not "1". That is, the mirror processing for the bit pattern is not allowed. As a result, the bit pattern on the side of the input A is selected by the selector 80 and the normal bit pattern is added to the background by the serial conversion circuit 85. Therefore, the superimposed characters as well as the background image is mirror-imaged by the mirror image signal generator circuit 19a.

Figure 4:
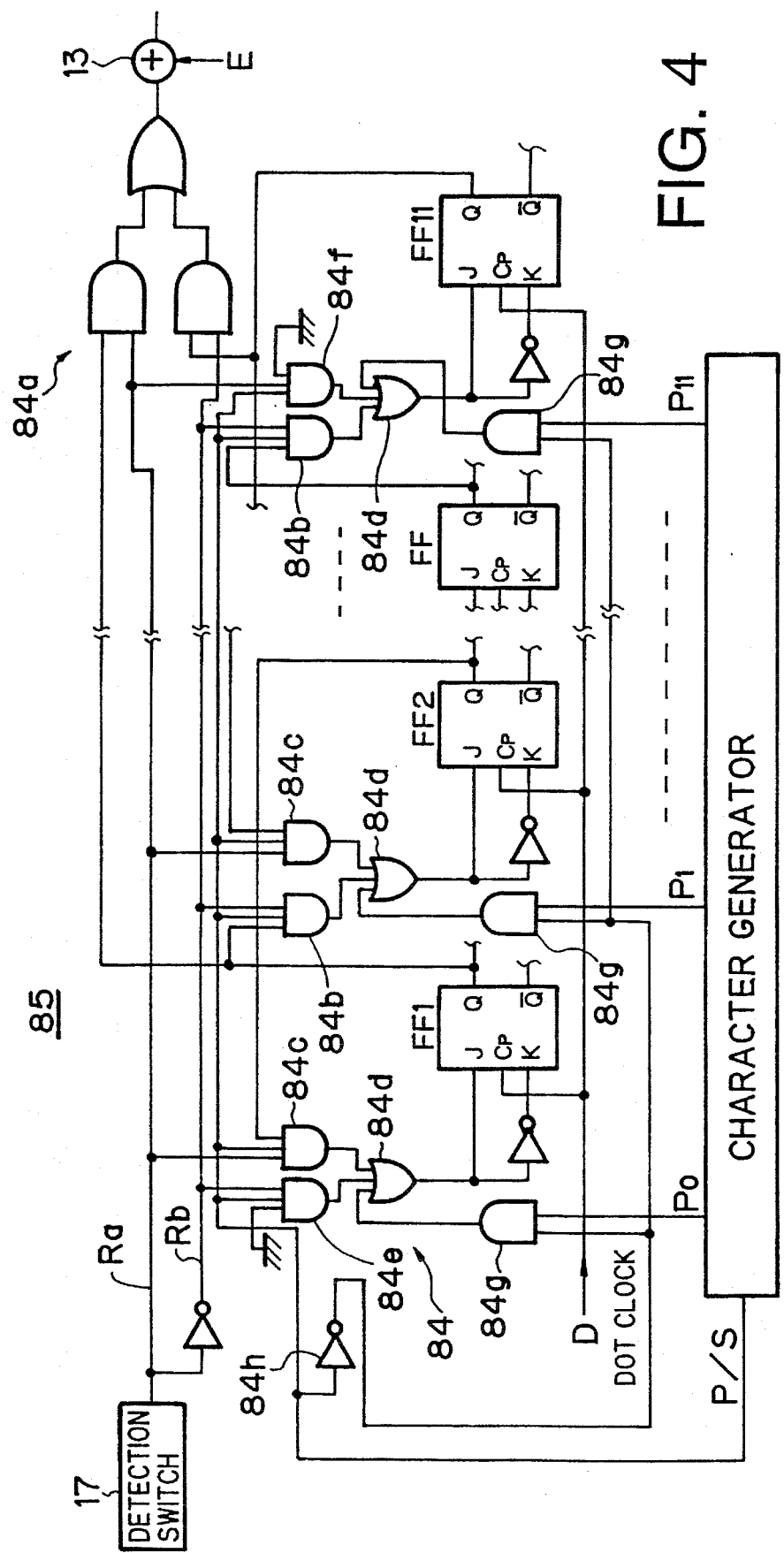
FIG. 4 is a block diagram of another example of the serial conversion circuit for generating a mirror image display pattern.

FIG. 4 shows another example of the serial conversion circuit 85. In this example, the mirror flag memory circuit 16 is unnecessary. A mirror bit pattern is generated directly according to an output of the detection switch 17.

Outputs P0, P1, ..., Pn of the character generator 17 are set in parallel in flip-flops FF1, FF2, ..., FF11 of a reversible shift register 84 and a serial display data is output from a gate circuit 84a.

When the detection switch 17 is in ON state, a control line Ra is "1" and a control line Rb is "0". Therefore, AND gates 84c and OR gates 84d, each provided between adjacent states, form a connection starting from FF11 and ending FF1 and a Q output of the FF1 is output to the gate circuit 84a as a display data according to the dot clock D. Thus, a mirror bit pattern is output from the serial conversion circuit 85. At this time, a P/S signal (parallel/serial conversion instructing signal which is generated when a bit pattern is loaded and LOW level of which is significant) from the character generator 7 which is received by the respective AND gates 84b, 84c, 84e and 84f as gate signal inputs is in HIGH level (=1).

When the detection switch 17 is in OFF state, the control line Ra is "0" and the control line Rb is "1". Therefore, the AND gates 84b and the OR gates 84d, each provided between adjacent states, form a connection starting from FF1 and ending FF11 and a Q output of the FF11 is output to the gate circuit 84a as a display data according to the dot clock D. Thus, a normal bit pattern is output from the serial converter circuit 85. At this time, a P/S signal is in HIGH level.

AND gates 84e and 84f connected to the OR gates 84d of FF1 and FF11, respectively, are supplied with "0" bit and function to input "0" to an initial stage FF. Therefore, for a forward shift, FF1 is set with "0" from the AND gate 84e every shift. For a reverse shift, FF11 is set with "0" from the AND gate 84f every shift. As a result, when the bit pattern of 12 bits corresponding to one line is output, values of the flip-flops FF1–FF11 become "0". Therefore, at a time when a bit pattern corresponding to a next one line is received, these flip-flops FF1–FF11 have been "0".

When the flip-flops FF1–FF11 receive a bit pattern corresponding to one line through the character generator 7, a P/S signal of LOW level (=0) is supplied from the character generator 7 to the respective AND gates 84b–84f. As a result, these gate circuits are closed. In this case, the flip-flops FF1–FF11 become 1-bit registers, respectively. The respective bit-outputs P0, P1, . . . , Pn of the bit pattern corresponding to one line are supplied to the respective OR gates 84d through AND gates 84g provided correspondingly to the respective stages. A gate signal for each AND gate 84g is the P/S signal inverted by an inverter 84h. Thus, when the P/S signal is in LOW level, the bit patterns are set in parallel in the respective FFs. Otherwise, the P/S signal is in HIGH level (=1).

It may be possible that the serial conversion circuit 85 utilizes the P/S signal generated by the address selection circuit 6. Similarly, it is possible that the address selection circuit 6 generates a signal which resets the respective FFs at a timing immediately before a bit pattern of the character generator 7 is set in the flip-flops FF1–FF11. In such case, the AND gates 84e and 84f can be removed.

As described, although, in the embodiments, the pattern generator circuit for generating the mirror image bit pattern is constituted with the wirings and the selector or with the reversible shift register, it can be constructed with other circuits so long as these circuits generate an output with the bit sequence of a serial bit pattern being inverted.

Although, in the embodiment shown in FIG. 2, the selection signal (control signal) for generating a mirror image pattern under logical product condition of the mirror flag memory circuit and the detection switch 17, it is possible to generate a mirror image pattern directly according to the signal of the detection switch 17 as in the case shown in FIG. 4.

Further, although, in the embodiments, the movie including the camera and the display device integrally provided with the camera is described, the present invention is applicable to any device of any system so long as the latter system includes a camera and a display device combined therewith and arranged in proximity such as TV telephone or TV conference device and includes a video image display device for displaying an image obtained by the camera on the display device.

Further, in the embodiments, the liquid crystal display device is used. For a system which uses a CRT display, a circuit which scans a deflection direction of horizontal scan in reverse direction may be provided on the side of the CRT display as the mirror image signal generator circuit.

What is claimed is:

1. A video image display device including a memory, a character generator and a write circuit adapted to output a character pattern while superimposing it on a displayed video image, comprising: a serial pattern generator circuit for outputting a serial bit pattern with normal bit sequence corresponding to one line received in parallel from said character generator and, in response to a control signal, generating serial bit pattern with inverted bit sequence; a combining circuit for combining an output of said serial pattern generator circuit with a video signal of said display device; and a mirror image signal generator circuit responsive to an output signal of said combining circuit and said control signal to generate a mirror image signal such that said serial bit pattern has a normal bit sequence;

wherein said serial pattern generator circuit comprises a mirror pattern generator circuit for generating, from said parallel bit pattern received from said character generator, a bit pattern having bit sequence reversed to bit significances of said parallel bit pattern; and a parallel/serial conversion circuit responsive to said parallel bit pattern from said character generator as a first bit pattern and said bit sequence reversed bit pattern from said mirror pattern generator circuit as a second bit pattern to output said second bit pattern after conversion thereof into a second serial bit pattern when said control signal is received and output said first bit pattern after conversion thereof into a first serial bit pattern when said control signal is not received;

wherein said mirror pattern generator circuit comprises a set of wirings for reversing the significances of bits of said parallel bit pattern from said character generator and said parallel/serial conversion circuit includes a selector for receiving said first and second bit patterns in significance correspondence relation, respectively, and selecting either of said first or second bit pattern, to convert said selected parallel bit pattern into either said first or second serial bit pattern;

the video image display device further comprising a video camera, a liquid crystal display device for monitoring said video image obtained by said video camera, and a detector for detecting whether or not a shooting direction of said video camera coincides with a direction of a display screen of said liquid crystal display device; wherein said control signal is generated from said detector when a coincidence is detected thereby; and a microprocessor and a mirror flag memory circuit; wherein said liquid crystal display device includes said mirror image signal generator circuit, said mirror image signal generator circuit generates said mirror image signal by inverting a scan direction of a signal corresponding to one horizontal line according to said control signal, said write circuit includes an address register for holding address data received from said microprocessor and outputting it to said memory and a data register for holding a character code received from said microprocessor and outputting it to said memory, said control signal output from said detector when the coincidence is detected is input to said microprocessor and said microprocessor sets a flag in said mirror flag memory circuit when a predetermined switch is not operated, and a selecting control signal for said selector is generated upon a logical product condition between said set flag and said control signal from said detector.

2. The video image display device claimed in claim 1, wherein said serial bit pattern with inverted bit sequence is obtained by generating respective bits constituting said parallel bit pattern corresponding to one line in a sequence opposite to the bit sequence of said serial bit pattern.

3. The video image display device claimed in claim 1, wherein said serial pattern generator circuit includes a reversible shift register for receiving said parallel bit pattern output from said character generator and outputting it as said serial bit pattern, said reversible shift register responds to said control signal to shift the parallel bit pattern in reverse direction to thereby outputs said serial bit pattern.

4. The video image display device claimed in claim 3, wherein said reversible shift register includes flip-flops equal in number to bits of said parallel bit pattern; and a circuit for inputting a value 0 to a first one of said flip-flops in a shifting direction upon a shift is provided.

* * * * *